COUNTERCURRENT OPERATION ~
A - FEED - METAL BOROHYDRIDE &
    ORGANIC ETHER SOLUTION
C - FEED - BORONTRIHALIDE
B - PRODUCT - DIBORANE
D - SPENT SOLUTION - METAL HALIDE -
    ORGANIC ETHER

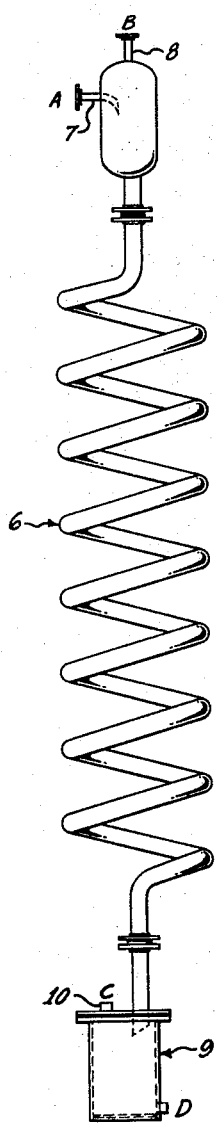

COCURRENT OPERATION ~
A - FEED - METAL BOROHYDRIDE &
    ORGANIC ETHER SOLUTION
B - FEED - BORONTRIHALIDE
C - PRODUCT - DIBORANE
D - SPENT SOLUTION - METAL HALIDE -
    ORGANIC ETHER

INVENTORS:
COLEMAN J. MAJOR
BY RAYMOND C. RHEES

HIS ATTORNEYS

United States Patent Office 3,142,538
Patented July 28, 1964

3,142,538
MANUFACTURE OF DIBORANE
Coleman J. Major, Iowa City, Iowa, and Raymond C. Rhees, Henderson, Nev., assignors, by mesne assignments, to AFN, Inc., a corporation of Delaware
Filed Sept. 9, 1960, Ser. No. 55,024
4 Claims. (Cl. 23—204)

This is a continuation-in-part of our application Serial No. 757,668, filed August 28, 1958.

This invention relates to a process for the manufacture of diborane in increased yield.

It has heretofore been proposed to manufacture diborane by reaction of a boron trihalide such as boron trichloride with the borohydride of an alkali metal or an alkaline earth metal. The reaction can be represented as follows:

$$3MBH_4 + BX_3 \xrightarrow[\text{medium}]{\text{solvent}} 2B_2H_6 + 3MX$$

where M is an alkali metal or an alkaline earth metal and X is a halogen. This reaction, the useful reactants and the solvent media useful are well known. A typical operation included charging a vessel with the required amount of sodium borohydride, for example, in solution in a solvent and passing boron trichloride into the mixture to produce diborane in a batchwise manner. Addition of the boron trichloride was continued until essentially all of the sodium borohydride initially present had been reacted to diborane. Under this procedure, the diborane yield is relatively poor and the diborane purity varies with time; during the early part of the reaction, the purity is relatively low, rising to a peak and then falling off toward the end of the reaction period.

It has also been proposed to carry out the reaction in a continuous manner by introducing a solution of the borohydride at one end of a reaction zone and passing a stream of boron trichloride counter-current to the stream of sodium borohydride. Diborane is removed at the end at which the borohydride is introduced while the spent solution is removed at the end where the boron trichloride is introduced, a typical counter-current operation. While this method provides an improvement over the batch operation, it nevertheless leaves much to be desired.

We have found that by passing the solution of the borohydride and the boron trihalide in parallel flow with one another, the diborane yield can be increased very substantially. Although we do not wish to be bound by any particular theory of operation, we believe that this is due to the fact that, as the sodium borohydride solution passes through the reaction zone, its concentration with respect to sodium borohydride decreases due to its reaction with the boron trichloride and formation of diborane. In the counter-current system of operation, boron trichloride is fed into the system at the point of minimum concentration of sodium borohydride. Since the boron trichloride concentration is highest at this point and since the reaction of sodium borohydride with boron trichloride is not instantaneous, a portion of the boron trichloride reacts with the solvent to form by-products, thus reducing the yield of diborane and partially decomposing the solvent. Further, since the boron trichloride is very soluble in the solvent, the upper part of the column has a low concentration of boron trichloride in the vapor and also in the solvent phase. Thus, the upper part of the column actually produces very little diborane.

In the co-current or parallel method of operation of this invention, the highest concentration of borohydride is at the point of highest concentration of boron trihalide. This minimizes the undesired reaction between the boron trihalide and solvent. Additionally, the boron trihalide is held in solution in the reaction zone until it is depleted by its reaction with the borohydride. Thus, the greater part of the zone is utilized with diborane formation. As a suitable reactor we have employed that shown in the accompanying drawing. In this, a pipe 6 is provided in spiral form. An inlet 7 is provided at the upper end of the spiral for introduction of a solution of the borohydride. Boron trihalide is fed in at the same end of the pipe through an inlet 8. At the bottom of the pipe, a tank 9 provides a receiver for spent solution. The diborane is removed through outlet 10 on the tank.

The feed rate of liquid at the top of the spiral is such that the reactor is filled only to the extent of a sixth or less of its volume; we usually operate at a liquid feed rate such that only about one-twentieth of the reactor volume is occupied by the liquid. As a consequence, the liquid flows as a shallow stream over the coiled pipe surface. The boron halide is rapidly absorbed, liberating diborane which passes freely down the coil to issue through outlet 10.

As illustrative of the practice of the invention and of this operation, the following are set forth:

*Example I.*—To illustrate the results obtained using the counter-current operation, a solution containing approximately 10% by weight of sodium borohydride in tetraethylene glycol dimethyl ether was pumped to the top of a reaction column as shown in the drawing and made up of 35 feet of a spiral pipe 1½ inches in diameter and standing vertically for 6 feet. The feed rate was such that only 5% of the reactor volume was filled with liquid at any instant. Boron trichloride vapor was fed in at the bottom of the column counter-current to the borohydride solution, while the diborane vapor was removed from the top of the column. Data obtained in this operation are shown in Table I.

*Example II.*—To illustrate the results obtained with co-current operation, a solution containing approximately 10% by weight of sodium borohydride in tetraethylene glycol dimethyl ether was pumped to the top of the same reaction column as in Example I. But boron trichloride vapor was fed in at the top of the column to flow co-current to the borohydride solution, while diborane was removed from the bottom of the column. Data obtained in this operation are likewise shown in Table I.

Table I

| Process | Grams diborane produced per 1,000 grams NaBH₄ consumed | Percent yield of diborane based on NaBH₄ |
|---|---|---|
| Counter-current, Example I | 306.2 | 63.2 |
| Co-current, Example II | 475 | 97.5 |

We claim:

1. In a process for producing diborane by reaction of a boron trihalide and a metal borohydride in solution in a borohydride solvent, the improvement consisting in the steps of introducing continuously a stream of boron trihalide vapor and a liquid stream of the metal borohydride solution into the top of a relatively long and narrow vertically disposed and helically shaped reaction zone wherein the streams mix and flow continuously and concurrently through said zone to the lower end thereof while reacting to form diborane and a solution of metal halide, the rate of introduction of the liquid stream being such that only about one-twentieth of the volume of the reaction zone is filled with liquid at any instant and that the liquid flows in a continuous shallow stream over the surface of said zone, and withdrawing diborane and the solution of metal halide continuously from said other end of said reaction zone.

2. In a process for producing diborane by reaction of a boron trichloride and a sodium borohydride in solution in a borohydride solvent, the improvement consisting in the steps of introducing continuously a stream of boron trichloride vapor and a liquid stream of the sodium borohydride solution at the top of a relatively long and narrow vertically disposed and helically shaped reaction zone wherein the streams mix and flow continuously and concurrently through said zone to the lower end thereof while reacting to form diborane and a solution of sodium chloride, the rate of introduction of the liquid stream being such that the liquid flows in a continuous shallow stream over the surface of said zone and that only the reaction zone is filled with liquid, at any instant, only to the extent of a maximum of one-sixth of its volume, and withdrawing diborane and the solution of sodium chloride continuously from said other end of said reaction zone.

3. A process as set forth in claim 1 wherein the borohydride is an alkali metal borohydride.

4. A process as set forth in claim 1 wherein the borohydride is an alkaline earth metal borohydride.

References Cited in the file of this patent

UNITED STATES PATENTS

| | | |
|---|---|---|
| 2,543,511 | Schlesinger et al. | Feb. 27, 1951 |
| 2,796,328 | Jackson et al. | June 18, 1957 |
| 2,983,582 | Smith et al. | May 9, 1961 |

FOREIGN PATENTS

| | | |
|---|---|---|
| 340,503 | Great Britain | Dec. 22, 1930 |

OTHER REFERENCES

Olsen et al.: "Chemical and Metallurgical Engineering," vol. 52, pp. 118–212 (May 1945).